US011019391B1

(12) United States Patent
Bigio et al.

(10) Patent No.: US 11,019,391 B1
(45) Date of Patent: *May 25, 2021

(54) DETERMINING LOCAL NETWORK CONNECTIONS OF DEVICES USING TOKENS

(71) Applicant: Facebook, Inc., Menlo Park, CA (US)

(72) Inventors: Aidymar Bigio, Hillsborough, CA (US); Mateusz Marek Niewczas, San Francisco, CA (US); Amir Shimoni, Brooklyn, NY (US); Tal Gilady, Brooklyn, NY (US)

(73) Assignee: Facebook, Inc., Menlo Park, CA (US)

( * ) Notice: Subject to any disclaimer, the term of this patent is extended or adjusted under 35 U.S.C. 154(b) by 58 days.

This patent is subject to a terminal disclaimer.

(21) Appl. No.: 16/590,688

(22) Filed: Oct. 2, 2019

Related U.S. Application Data (63) Continuation of application No. 15/657,939, filed on Jul. 24, 2017, now Pat. No. 10,477,266.

(51) Int. Cl.
*H04N 21/4363* (2011.01)
*H04N 21/41* (2011.01)
(Continued)

(52) U.S. Cl.
CPC ....... *H04N 21/43637* (2013.01); *H04L 63/10* (2013.01); *H04L 67/06* (2013.01); *H04L 67/18* (2013.01); *H04L 67/20* (2013.01); *H04L 67/306* (2013.01); *H04N 21/25808* (2013.01); *H04N 21/4122* (2013.01); *H04N 21/4126* (2013.01); *H04N 21/44227* (2013.01);
(Continued)

(58) Field of Classification Search
CPC ......... H04N 21/43637; H04N 21/4122; H04N 21/4126; H04N 21/4108; H04N 21/44227
See application file for complete search history.

(56) References Cited

U.S. PATENT DOCUMENTS 9,084,003 B1 7/2015 Sanio et al.
10,439,676 B2 * 10/2019 Belk ....................... H04W 4/00
(Continued)

OTHER PUBLICATIONS

United States Office Action, U.S. Appl. No. 15/657,965, dated Aug. 18, 2020, 23 pages.
(Continued)

*Primary Examiner* — Pinkal R Chokshi
(74) *Attorney, Agent, or Firm* — Fenwick & West LLP (57) ABSTRACT

An online system determines that a mobile device of a user and content device are connected to the same local network. To determine whether the content device is associated with the user, the online system provides a token and network ports to the content device. The content device establishes a connection to the mobile device using a selected network port to send the token. Responsive to receiving the token from the mobile device, the online system determines that the devices are connected to the same local network. The online system may also determine that the devices are within physical proximity to each other. The online system may send content items to the devices, and the user may view or interact with the content items simultaneously on multiple devices. Thus, the mobile device or content device acts as a complementary "second screen" or "control device" for the other device.

20 Claims, 6 Drawing Sheets

(51) Int. Cl.
  *H04N 21/442* (2011.01)
  *H04N 21/258* (2011.01)
  *H04L 29/06* (2006.01)
  *H04L 29/08* (2006.01)
  *H04W 4/80* (2018.01)
  *H04W 4/02* (2018.01)

(52) U.S. Cl.
  CPC .......... *H04W 4/80* (2018.02); *H04N 21/4108* (2013.01); *H04W 4/023* (2013.01)

(56) References Cited

U.S. PATENT DOCUMENTS

| | | |
|---|---|---|
| 2005/0177861 A1 | 8/2005 | Ma et al. |
| 2006/0020960 A1 | 1/2006 | Relan et al. |
| 2011/0069940 A1 | 3/2011 | Shimy et al. |
| 2011/0071841 A1 | 3/2011 | Fomenko et al. |
| 2011/0141293 A1 | 6/2011 | Yoneyama et al. |
| 2012/0315848 A1 | 12/2012 | Smith et al. |
| 2013/0027613 A1 | 1/2013 | Kim et al. |
| 2013/0124309 A1 | 5/2013 | Traasdahl et al. |
| 2014/0157339 A1 | 6/2014 | Zhang et al. |
| 2014/0168071 A1 | 6/2014 | Ahmed et al. |
| 2015/0234820 A1 | 8/2015 | Aravamudan |
| 2015/0237394 A1 | 8/2015 | Haykinson et al. |
| 2015/0326692 A1 | 11/2015 | Kaneko et al. |
| 2016/0006864 A1 | 1/2016 | Park et al. |
| 2016/0105826 A1 | 4/2016 | Matsunaga |
| 2016/0149891 A1 | 5/2016 | Kuper et al. |
| 2016/0219319 A1 | 7/2016 | Servignat et al. |
| 2016/0262198 A1 | 9/2016 | Gardner, III et al. |
| 2016/0294842 A1 | 10/2016 | Ramalingam et al. |
| 2016/0359932 A1 | 12/2016 | Cho et al. |
| 2016/0371751 A1 | 12/2016 | Cohen |
| 2017/0048590 A1 | 2/2017 | Chen |
| 2017/0094345 A1 | 3/2017 | Zerr et al. |
| 2017/0134802 A1 | 5/2017 | D'Acunto et al. |
| 2017/0150305 A1 | 5/2017 | Chaudhri et al. |
| 2017/0228774 A1 | 8/2017 | Sallas et al. |
| 2017/0324790 A1 | 11/2017 | Li et al. |
| 2018/0095615 A1 | 4/2018 | Martier et al. |
| 2018/0348965 A1 | 12/2018 | Stekkelpak |

OTHER PUBLICATIONS

United States Office Action, U.S. Appl. No. 15/657,965, dated Apr. 25, 2018, 19 pages.
United States Office Action, U.S. Appl. No. 15/657,965, dated Feb. 19, 2019, 20 pages.
United States Office Action, U.S. Appl. No. 15/657,965, dated Oct. 26, 2018, 20 pages.
United States Office Action, U.S. Appl. No. 15/657,965, dated Sep. 5, 2019, 20 pages.
United States Office Action, U.S. Appl. No. 15/657,965, dated May 13, 2020, 22 pages.
United States Office Action, U.S. Appl. No. 15/657,965, dated Feb. 3, 2020, 20 pages.

* cited by examiner

Determine that a content device and a mobile device of a user are simultaneously connected to a local network.
510

Determine a user profile of the user
520

Send a first content item to the content device
530

Send a second content item to the mobile device
540

Receive information indicating an interaction with the second content item performed using the mobile device
550

Send instructions to update the first content item responsive to receiving the information indicating the interaction
560

FIG. 5

DETERMINING LOCAL NETWORK CONNECTIONS OF DEVICES USING TOKENS

CROSS REFERENCE TO RELATED APPLICATIONS

This application is a continuation of co-pending U.S. application Ser. No. 15/657,939, filed Jul. 24, 2017, which is incorporated by reference in its entirety.

BACKGROUND

This disclosure generally relates to determining that mobile devices and content devices are connected to the same local networks, and to providing customized content to these devices.

Users of an online system view and interact with content presented on their mobile devices such as smartphones. Since smartphones are typically personal devices, the online system may customize the content provided to the smartphones. In other words, based on user-specific information received from a personal mobile device, the online system may determine content items likely to be interesting to a particular user. However, the number of electronic devices that users can use to access online content has been increasing. For instance, in addition to smartphone type mobile devices, users have smart TVs, set-top boxes, or other types of content devices that provide digital media. In contrast to smartphones, smart TVs and set-top boxes may not be personal devices, e.g., multiple users in a household may use the same smart TV, and the users may not need to log in to an account on a content device as they would for applications on a smartphone. Thus, conventional systems are unable to provide customized content to these non-personal content devices. It is challenging and desirable for an online system to determine which specific users are using a content device, so that the online system can personalize the content presented to the users.

SUMMARY

An online system determines that mobile devices and content devices are connected to the same local network. In an embodiment, a user that interacts with the online system using a smartphone mobile device also uses other types of content devices to access online content. For example, the user watches TV shows and movies on a smart TV or via a set-top box, or listens to music or radio using a digital media streaming device. The online system can associate the smartphone to the user because the user logs in to a user profile via an application on the smartphone. However, the user may not necessarily log in using content devices. Thus, to determine whether a content device is associated with a certain user, the online system provides a token and network ports to the content device. A content device that is connected to the same local network (e.g., a WiFi network at the user's home or office) as the mobile device can establish a connection together using a selected network port, and send the token to the mobile device. Responsive to receiving the token from the mobile device, the online system determines that the mobile device and the content device are connected to the same local network. Thus, the online system may send content items to one or both of the devices, and the user may view or interact with content items simultaneously on multiple devices.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

I. System Overview

Figure 1A:
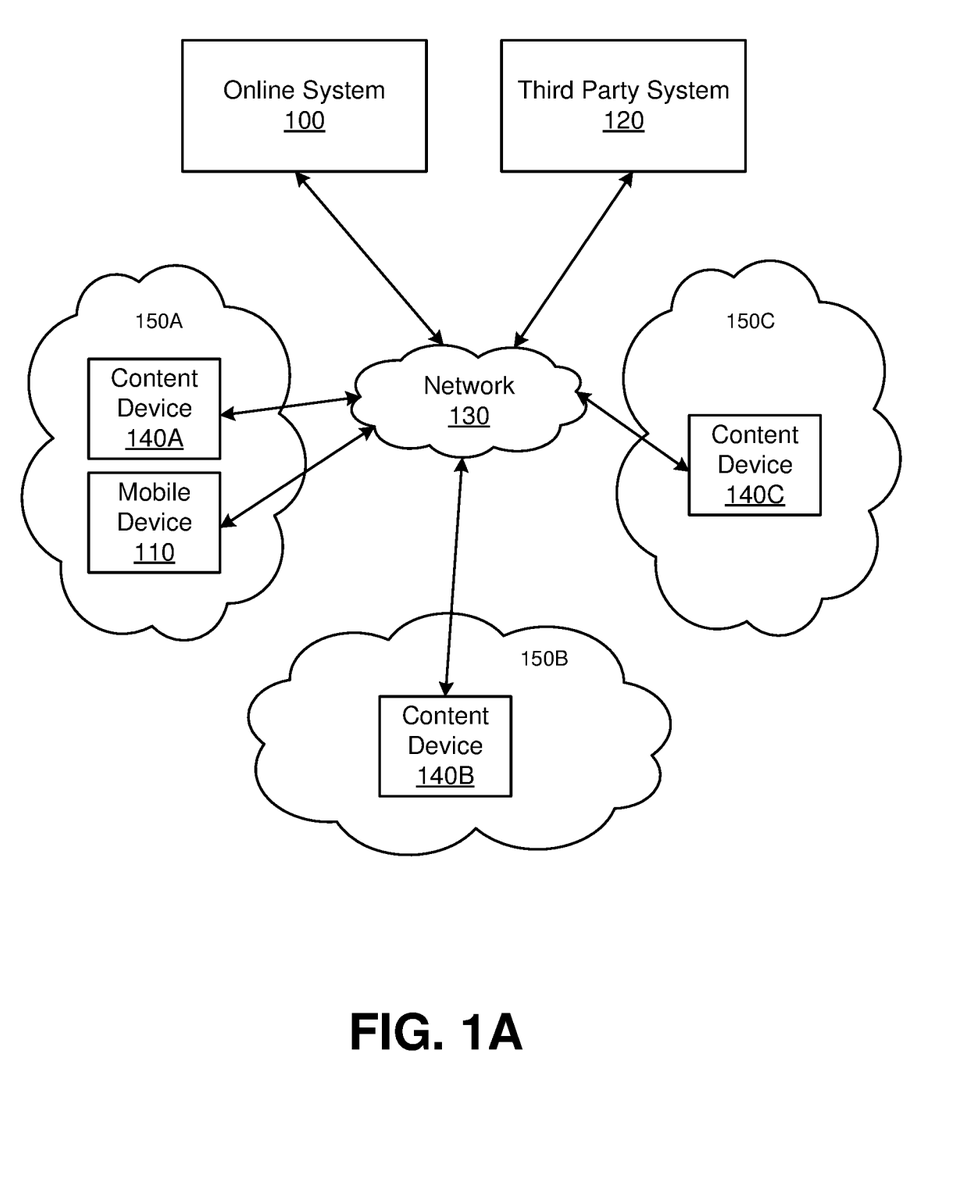
FIG. 1A is a diagram of a system environment for providing content to devices connected to local networks according to one embodiment.

FIG. 1A is a diagram of a system environment for providing content to devices connected to local networks according to one embodiment. The system environment includes an online system 100, one or more third party systems 120, and one or more local networks 150 connected to each other via a network 130. Each of the local networks 150 may include one or more mobile devices 110 and one or more content devices 140. Mobile devices 110 and content devices 140 may be collectively referred to herein as a "device" or "devices." In the embodiment shown in FIG. 1A, local network 150A includes the content device 140A and mobile device 110; local network 150B includes content device 140B; local network 150C includes content device 140C. Over time, devices may become online or offline in the local networks 150. In other embodiments, different and/or additional entities can be included in the system environment.

The online system 100 allows users of the online system 100 to communicate or otherwise interact with each other and access content. The online system 100 receives information about the users, for example, user profile information and information about actions performed by users on the online system 100 or a third party system 120. The online system 100 stores the information associated with user profiles, e.g., in a social graph data structure. In addition, the online system 100 provide content items (e.g., text, images, video, audio, or other types and combinations of media) for presentation to users via mobile devices 110 or content devices 140. The online system 100 may use a token to determine that a given mobile device 110 and a given content device 140 are simultaneously connected to a same local network 150. Thus, the online system can personalize content items sent to both mobile devices 110 and content devices 140 based on the known information about the users.

A third party system 120 may also provide content items for communication to users via mobile devices 110 and content devices 140. Such an entity may be a company or other type of organization offering a product or message. In some embodiments, the third party system 120 provides compensation to the online system 100 in return for the online system 100 presenting the third party system's 120 content items to users. Further, the third party system 120 may provide criteria indicating attributes of users to which to target certain types of content items.

A mobile device 110 is a computing device capable of receiving user input as well as transmitting or receiving data via the network 130. In one embodiment, a mobile device 110 is a conventional computer system, such as a desktop or laptop computer. Alternatively, a mobile device 110 may be a device having computer functionality, such as a personal digital assistant (PDA), a mobile telephone, a smartphone, or another suitable device. In one embodiment, a mobile device 110 executes an application allowing a user of the mobile device 110 to interact with the online system 100 or a third party system 120. For example, a mobile device 110 executes a browser application to enable interaction between the mobile device 110 and the online system 100 via the network 130.

Since users may log in or sign in to the user's account on the online system 100, the online system 100 can associate a mobile device 110 to the particular user who owns or uses that mobile device 110. For instance, the mobile device 110 stores a cookie (also referred to as a web cookie, Internet cookie, or browser cookie), which the online system 100 may use to identify the corresponding user of the mobile device 110. In some embodiment, a mobile device 110 interacts with the online system 100 through an application programming interface (API) running on a native operating system of the mobile device 110, such as IOS® or ANDROID™.

A content device 140, similar to a mobile device 110, is also a computing device capable of receiving user input as well as transmitting or receiving data from the online system 100 or a third party system 120 via the network 130. In some embodiments, the content device 140 is a smart TV, set-top box, digital media streaming device, Internet of things (IoT) device, or another type of device suitable for presenting content to users. In contrast to a mobile device 110, a user of a content device 140 may not necessarily log in to a user profile (or user account) using the content device 140. Moreover, in some embodiments, mobile devices 110 are normally associated with one user, while content devices 140 may be used by any number of users (e.g., simultaneously or at different times). In some embodiments, a content device 140 executes an application associated with a third party system 120.

A local network 150, also known as a local area network (LAN) connects devices within a given geographic area. Local networks 150 may use wired transmission technologies (e.g., Ethernet) or wireless transmission technologies (e.g., WiFi). For example, a local network 150 may be a WiFi network connecting devices within a house, apartment, commercial building, office building, or outdoors area.

The network 130 includes any combination of local area networks (e.g., local networks 150) or wide area networks, using wired or wireless communication systems. In one embodiment, the network 130 uses standard communications technologies and/or protocols. For example, the network 130 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 130 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 130 may be represented using any suitable format, such as hypertext markup language (HTML) or extensible markup language (XML). In some embodiments, all or some of the communication links of the network 130 may be encrypted using any suitable technique or techniques.

Figure 1B:
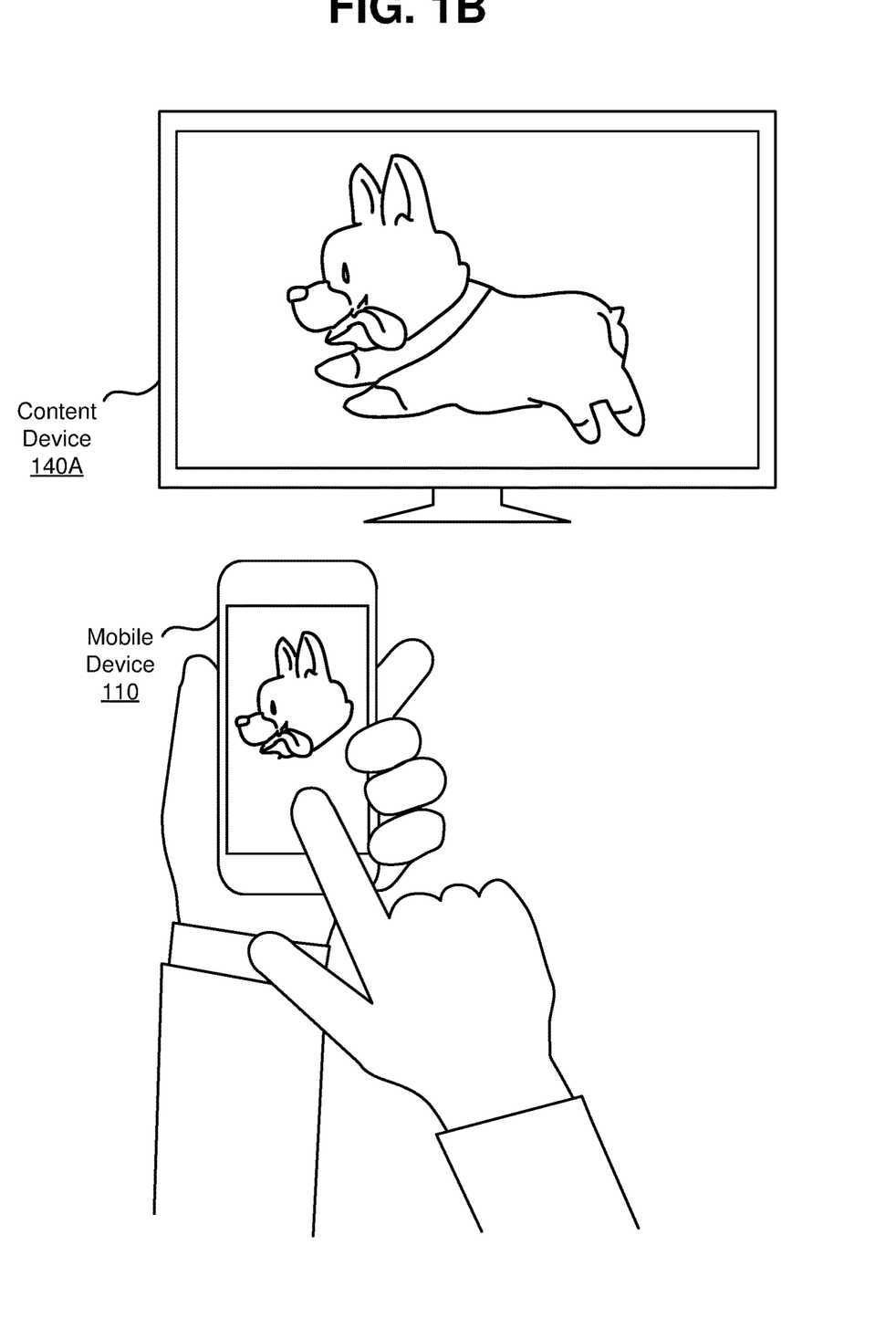
FIG. 1B is a diagram illustrating content presented on a content device and a mobile device according to one embodiment.

FIG. 1B is a diagram illustrating content presented on the content device 140A and the mobile device 110 according to one embodiment. In an example use case shown in FIG. 1B, the online system 100 identifies a user of the smartphone mobile device 110. The user is logged into the user's account on the online system 100 via the smartphone, but the user is not logged into an account via the smart TV content device 140A. Nonetheless, the online system 100 determines that the user is using both the mobile device 110 and the content device 140, e.g., the user is at home browsing through TV shows or movies on the smart TV with the smartphone nearby as well. In particular, the online system 100 determine that the mobile device 110 and the content device 140 are simultaneously connected to the local network 150A at the user's home using a method involving a token, which is further described below. Thus, the online system 100 provides personalized content items to the smart TV and the smartphone. Responsive to determining that the user has an affinity for dogs, e.g., the online system 100 sends a first content item including an image of a corgi for presentation on a display of the smart TV, and sends an associated second content item for presentation on the smartphone. The second content item may be complementary to the first content item, e.g., the former includes a zoomed-in version of the corgi shown in the latter. In some embodiments, the two content items may be the same or include similar content. Thus, one of the devices serves as a complementary "second screen" for the other device, to display additional content items.

By providing customized content items to both a content device 140 and mobile device 110 of the user, the online system 100 may provide a more engaging user experience that is personalized to the user. For example, the smart TV content device 140 has a larger display than the smartphone mobile device 110, but may not include as many user controls (e.g., a touch screen interface) as the mobile device 110. Thus, by providing complementary content items simultaneously to the two devices, the user can interact with the content item displayed on the smart TV using the smartphone, e.g., serving as a complementary "control device." For instance, the smart TV shows an image of a car, and the user can explore different views outside and inside the car using the smartphone, resulting in a more immersive experience than would be possible with only one of the two devices. In some embodiments, the mobile device 110 or content device 140 may be a virtual or augmented reality (VR/AR) type device.

II. Example System Architecture of Online System

Figure 2:
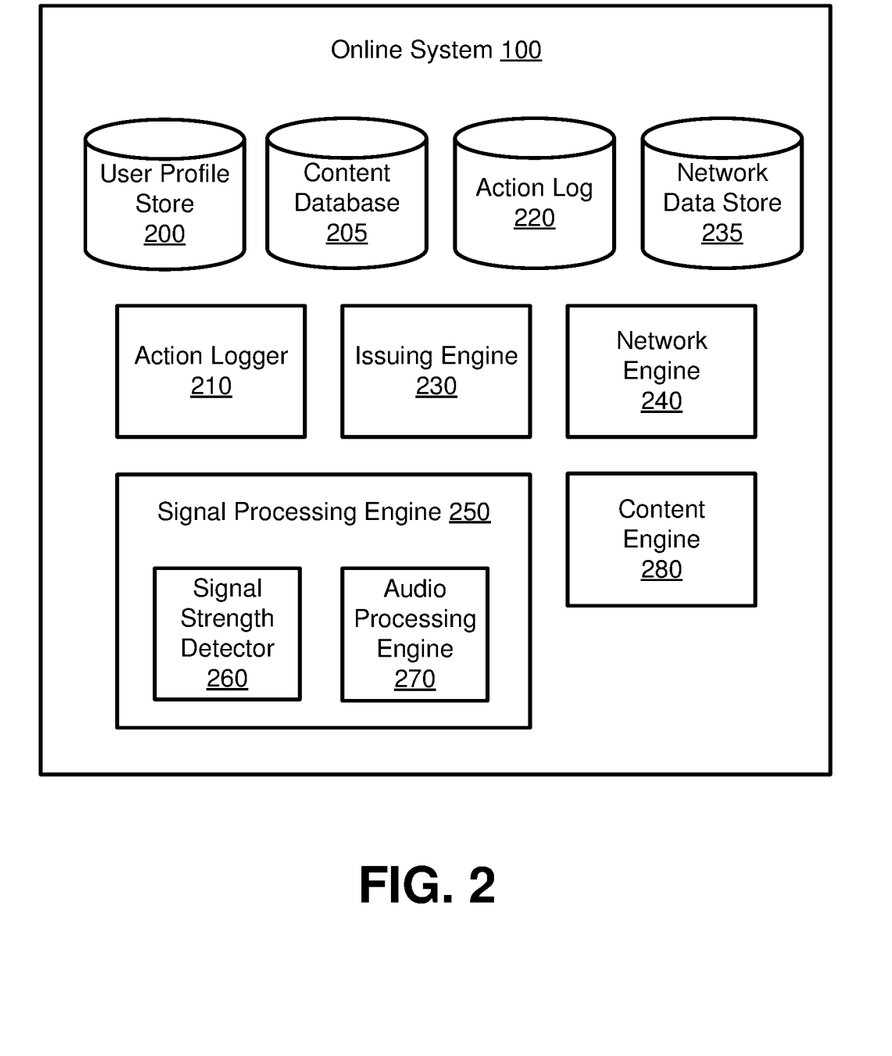
FIG. 2 is a block diagram of an online system for providing content items according to one embodiment.

FIG. 2 is a block diagram illustrating the system architecture of the online system 100 for providing content items according to one embodiment. The online system 100 includes a user profile store 200, content database 205, action logger 210, action log 220, issuing engine 230, network data store 235, network engine 240, signal processing engine 250, and content engine 280. In other embodiments, the online system 100 may include additional, fewer, or different components for various applications. Conventional components such as network interfaces, security functions, load balancers, failover servers, management and network operations consoles, and the like are not shown so as to not obscure the details of the system architecture.

The user profile store 200 stores user profiles associated with users of the online system 100. A user profile includes declarative information about the user that was explicitly shared by the user and may also include profile information inferred by the online system 100. In one embodiment, a user profile includes multiple data fields, each describing one or more attributes of the corresponding user of the online system 100. Examples of information stored in a user profile include biographic, demographic, and other types of descriptive information, such as work experience, educational history, gender, hobbies or preferences, location and the like.

A user profile may also store other information provided by the user, for example, images or videos. In certain embodiments, images of users may be tagged with identification information of users of the online system 100 displayed in an image. A user profile in the user profile store 200 may also maintain references to actions by the corresponding user performed on the online system 100. The user profile store 200 further stores data describing one or more relationships between different users and allows users to specify their relationships with other users. For example, these user-defined relationships allow users to generate relationships with other users that parallel the user's real-life relationships, such as friends, co-workers, partners, and the like.

The user profile store 200 can store user profiles associated with individuals, as well as user profiles associated with entities such as businesses or organizations, e.g., associated with a third party system 120. This allows an entity to establish a presence on the online system 100 for connecting and exchanging content with other users of the online system 100. The entity may post information about itself, about items associated with the entity, for example, products offered by the entity, or provide other information to users of the online system 100 using a brand page associated with the entity's user profile. Users of the online system 100 may connect to the brand page to receive information posted to the brand page or to receive information from the brand page. A user profile associated with the brand page may include information about the entity itself, providing users with background or informational data about the entity.

The action logger 210 receives communications about user actions internal to and/or external to the online system 100, populating the action log 220 with information about user actions. Examples of actions include adding a connection to another user, sending a message to another user, uploading an image, reading a message from another user, viewing content associated with another user, attending an event posted by another user, among others. In addition, a number of actions may involve an object and one or more particular users, so these actions are associated with those users as well and stored in the action log 220.

The action log 220 may be used by the online system 100 to track user actions on the online system 100, as well as actions on third party systems 120 that communicate information to the online system 100. Users may interact with various objects on the online system 100, and the action logger 210 stores information describing these interactions in the action log 220. Examples of interactions with objects include: interacting with a content items displayed on a user interface of a content device 140 or mobile device 110, viewing products on a brand page, commenting on posts, sharing links, and checking-in to physical locations via a mobile device 110, and any other interactions. Additional examples of interactions with objects on the online system 100 that are included in the action log 220 include: acquiring a product from a third party system 120, commenting on a photo album, communicating with a user, establishing a connection with an object, joining an event to a calendar, joining a group, creating an event, authorizing an application, using an application, and expressing a preference for an object ("liking" the object).

The issuing engine 230 and the network engine 240 determine whether content devices 140 and mobile devices 110 are connected to the same local networks 150. The issuing engine 230 communicates with content devices 140 to issue tokens, e.g., which function similarly to a web cookie. In particular, responsive to the issuing engine 230 identifying a content device 140 that is online (e.g., connected to the network 130 via a local network 150), the issuing engine 230 sends a range of ports and a token to the content device 140. Further, the issuing engine 230 requests the content device 140 to select one of the ports and listen for a connection on a local network 150 by opening the selected port. The issuing engine 230 may determine the token randomly and associate a specific token with the content device 140, e.g., to be saved in the network data store 235. In use cases where there are multiple content devices 140 in a certain geographic area, the issuing engine 230 may provide unique tokens to each of the content devices 140.

The network engine 240 communicates with mobile devices 110 to receive tokens from the mobile devices 110. In particular, when a mobile device 110 is online, the mobile device 110 sends network information to the network engine 240, for example, indicating an IP address (e.g., IPV6), a subnet, or other network identifying information. Responsive to the network engine 240 suspecting that the mobile device 110 is connected to the same local network 150 as a given content device 140 (previously issued a token) based on the network information, the network engine 240 provides the port selected by the given content device 140 to the mobile device 110. At this point, the network engine 240 may not necessarily know for certain that the mobile device 110 is connected to the same local network 150 because multiple devices could have the same IP address, but not be connected to the same local network.

If the mobile device 110 is able to connect to the given content device 140 using the selected port, the given content device 140 sends the token to the mobile device 110. In turn, the mobile device 110 sends the token to the network engine 240. Since the issuing engine 220 stored information about the token previously provided to the content device 140 in the network data store 235, the network engine 240 can compare the token received from the mobile device 110 with the stored token information. Responsive to determining a match of the tokens, the network engine 240 verifies that the devices are connected on the same local network 150. On the other hand, responsive to the network engine 240 not identifying a suspected shared local network connection, the network engine 240 may store the network information received from the mobile device 110 in the network data store 235, and may later access the stored information when other content devices 140 come online.

Once the online system 100 determines that a mobile device 110 and content device 140 are on the same local network 150, the online system 100 may not know whether the devices are physically located nearby each other, in some embodiments. If the content device 140 is not nearby the mobile device 110, the user will not be able to view (e.g., simultaneously or during the same session) content items displayed on both of the devices. For instance, the mobile device 110 and content device 140 are both connected to the same WiFi local network 150 at the user's house, but the user and the mobile device 110 are located in a different room of the house than the content device 140. Thus, to determine a physical proximity between a mobile device 110 and a content device, the signal processing engine 250 analyzes signals received from the mobile device 110 or the content device 140. In some embodiments, the signal processing engine 250 includes a signal strength detector 260 and an audio processing engine 270.

In one embodiment, the signal strength detector 260 determines the strengths of signals detected by the mobile device 110 or the content device 140. The devices may detect signals such as WiFi signals, BLUETOOTH® signals, or infrared (IR) signals, among others. The signal strength detector 260 may determine a received signal strength indicator (RSSI) of the detected signal or another type of signal strength measurement. Responsive to determining that the strength of a signal is greater than a threshold value, the signal strength detector 260 determines that a mobile device 110 is located in physical proximity to a content device 140. For example, if the mobile device 110 and content device 140 are both located nearby a WiFi router or BLUETOOTH® beacon, the detected signals from each device will have comparable signal strengths. In some embodiments, the signal strength detector 260 sends instructions to one of the mobile device 110 or the content device 140 to send a short-range transmission (WiFi or BLUETOOTH® signals), which may be detected by the other device if the two devices are located nearby each other. In other words, one of the devices functions as a beacon.

In one embodiment, the audio processing engine 270 analyzes audio signals detected by the mobile device 110 or the content device 140. In one example, responsive to determining that the volume of a detected audio signal is greater than a threshold value, the audio processing engine 270 determines that a mobile device 110 is located in physical proximity to a content device 140. The audio processing engine 270 may also analyze other parameters of audio signals such as frequency, variance, or patterns extracted from the signal, to determine physical proximity. Additionally, the audio processing engine 270 may implement audio processing techniques known to one skilled in the art, e.g., voice recognition or filtering algorithms. Similar to the signal strength detector 260, the audio processing engine 270 may send instructions to one of the mobile device 110 or content device 140 to function as an "audio beacon." If the two devices are nearby each other, then an audio signal played by device designated as the beacon will be detected by the other device. In use cases where multiple devices detect the same signal, the signal processing engine 250 may determine which of the detecting devices is closest to the origin of the signal (e.g., a device functioning as the beacon).

The content engine 280 sends content items to mobile devices 110 and content devices 140 for presentation to users of the online system 100. The content engine 280 can analyze information from other components of the online system 100 (e.g., the user profile store 200 or action log 220) to generate content items. Additionally, the content engine 280 may store generated content items or content items received from a third party system 120 in the content database 205. In some embodiments, the content engine 280 sends content items that include sponsored content.

In some embodiments, the content engine 280 sends content items to devices responsive to the online system 100 determining that the devices are connected to the same local network 150 and/or located within physical proximity to each other. Additionally, the content engine 280 may send content items, which are associated with or complementary to each other, to nearby devices. For example, a first content item includes one view (e.g., a top, bottom, side, isometric, perspective, exploded, or cross-sectional view) of a graphic or object, and a second content item includes a different view of the same graphic or object. As another example, a first content item includes a first video and a second content item includes a second (e.g., different or the same) video that is synchronized with the first video. Moreover, the content engine 280 may send instructions to a device to update a content item displayed on the device, e.g., responsive to the action logger 210 determining that a user interacted with the content item or another content item. In one use case, the action logger 210 determines that the user acquired an item, e.g., a movie or a song, using a smartphone mobile device 110, and a smart TV content device 140 (nearby the user) updates its display to play the movie or the song. In some embodiments, the content engine 280 selects which content items to send based on previously provided content items. For example, the action logger 210 determines that a user viewed a content item associated with a third party system 120 on a smart TV content device 140 at the user's house. Thus, the content engine 280 sends another content item associated with the third party system 120 for display on a different content device 140, e.g., another smart TV at the apartment of the user's friend when the user visits the friend's apartment.

In some embodiments, the content engine 280 sends content items for presentation responsive to determining that a user has visited a certain geographic area at least a threshold number of times during a predetermined period (e.g., 3 times in 7 days). The content engine 280 may track the number of times the user visits the certain geographic area based on the issuing engine 230, network engine 240, and signal processing engine 250 determining instances in which a mobile device 110 of the user is physically located nearby a content device 140 and also connected to the same local network 150. For instance, the content engine 280 tracks how many times the user visits a living room of the user's house that includes a smart TV content device 140. In some embodiments, the content engine 280 does not send a sponsored content item to the devices during the first detected instance of a mobile device 110 being located nearby a content device 140.

III. Example Sequence Diagram for Providing Content Items

Figure 3:
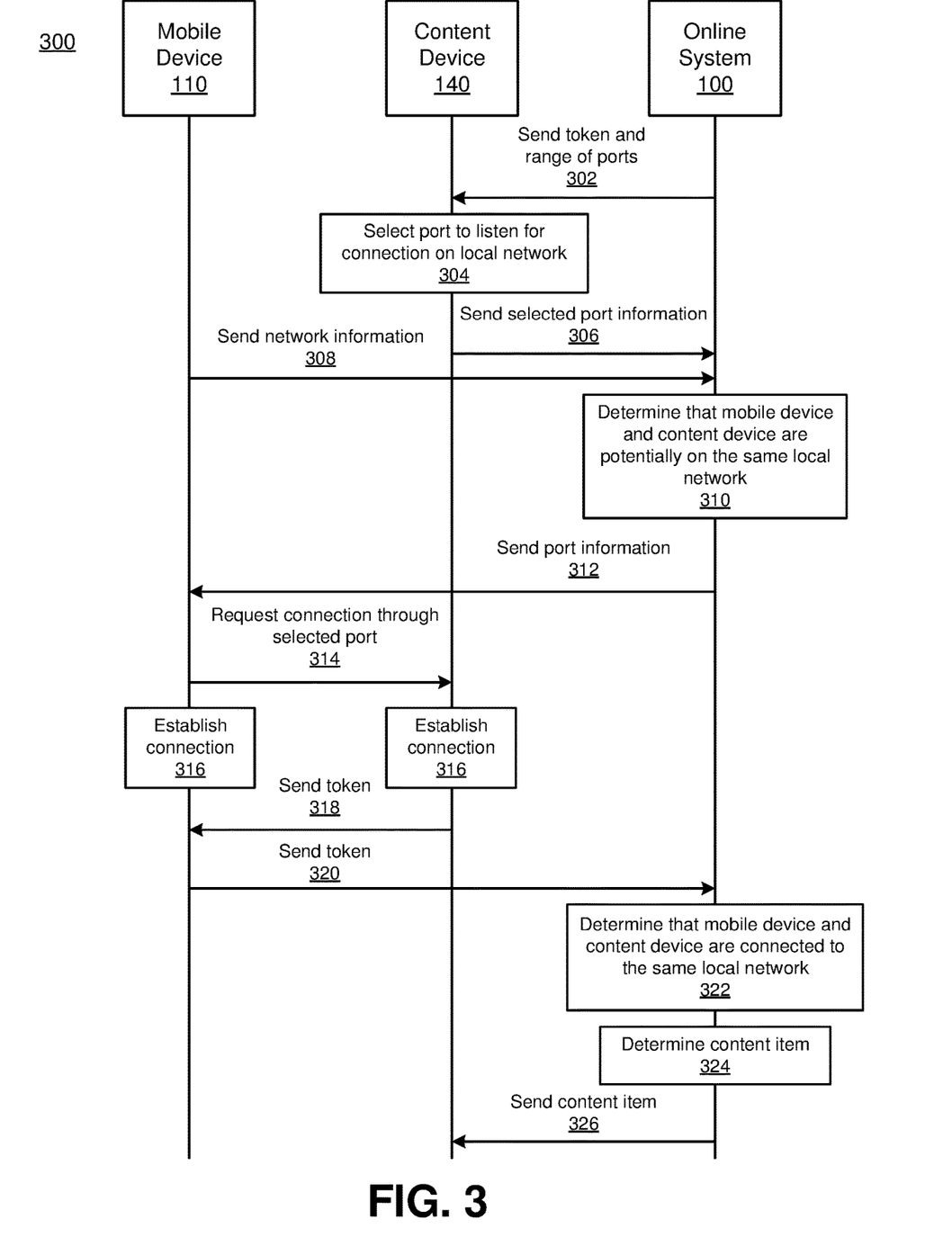
FIG. 3 is a sequence diagram for providing content to a content device connected to a same local network as a mobile device according to one embodiment.

FIG. 3 is a sequence diagram 300 for providing content to a content device 140 connected to a same local network 150 as a mobile device 110 according to one embodiment. In the example shown in FIG. 3, the online system 100 sends 302 a token and range of ports to the content device 140. The content device 140 selects 304 a port to listen for a connection on a local network 150 and sends 306 the selected port information to the online system 100. A mobile device 110 also connected to the local network 150 sends 308 network information to the online system 100. Using the received information, the online system 100 determines 310 that the mobile device 110 and content device 140 are potentially connected to the same local network 150. For example, the online system determines that there is a possible match between the IP addresses or subnets of the mobile device 110 and content device 140.

To confirm the suspected connection of the mobile device 110 and content device 140 to the local network 150, the online system 100 sends 312 information about the selected port to the mobile device 110. Using the selected port, the mobile device 110 requests 314 to connect to the content device 140. If the mobile device 110 and content device 140 are indeed connected to the same local network 150, the two devices establish 316 a connection with each other. In some embodiments, the devices periodically execute a background process (e.g., which can run even if a user is not actively interacting with a client application using the device) to perform these steps for trying to establish a connection. The content device 140 sends 318 the token to the mobile device 110 via the established connection. The mobile device 110 sends 320 the received token to the online system 100. Since the online system 100 originally sent the token (in step 302) to the content device 140, the online system 100 can determine 322 that the mobile device 110 and content device 140 are connected to the same local network 150 based on the token received from the mobile device 110. Responsive to confirming that the two devices are on the same local network 150, the online system 100 determines 324 a content item customized for a user of the devices and sends 326 the content item to the content device 140 for presentation to the user.

IV. Example Process Flows

Figure 4:
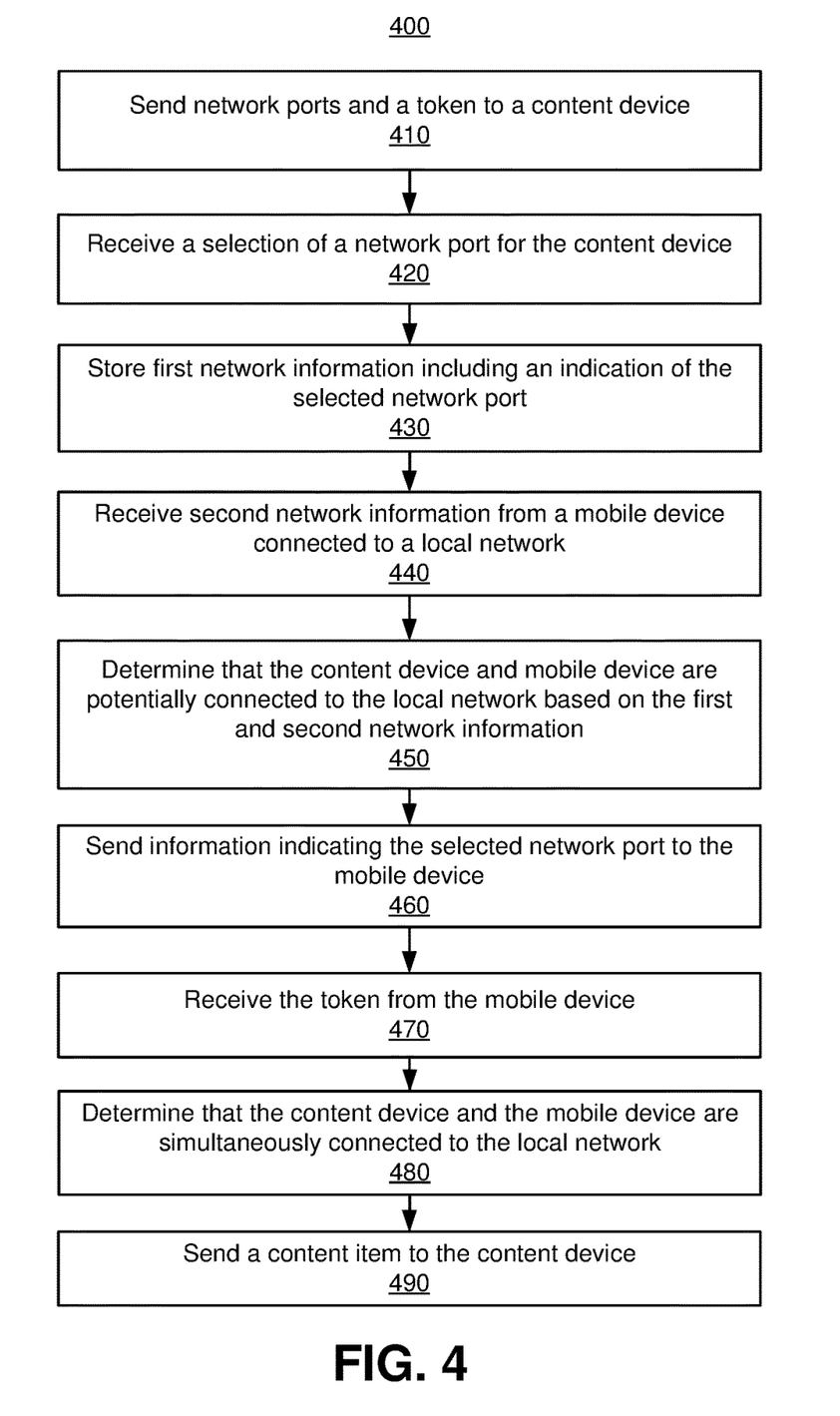
FIG. 4 is a flowchart illustrating a process using a token for providing a content item to a content device according to one embodiment.

FIG. 4 is a flowchart illustrating a process 400 using a token for providing a content item to a content device according to one embodiment. In some embodiments, the process 400 is performed by the online system 100—e.g., modules of the online system 100 described with reference to FIG. 2—within the system environment in FIG. 1. The process 400 may include different or additional steps than those described in conjunction with FIG. 4 in some embodiments or perform steps in different orders than the order described in conjunction with FIG. 4.

In one embodiment, the issuing engine 230 sends 410 network ports and a token to a content device 140. The issuing engine 230 receives 420 a selection of one of the network ports from the content device 140. The issuing engine 230 stores 430 first network information associated with the content device 140 in the network data store 235, where the first network information includes an indication of the selected network port. The network engine 240 receives 440 second network information from a mobile device 110 connected to a local network 150. The network engine 240 determines 450 that the content device 140 and the mobile device 110 are potentially connected to the local network 150 based on the first network information and the second network information. The network engine 240 sends 460 information indicating the selected port to the mobile device 110 in response to determining that the content device 140 and the mobile device 110 are potentially connected to the local network 150. The content device 140 provides the token to the mobile device 110 through a connection established via the selected port. The network engine 240 receives 470 the token from the mobile device 110. The network engine 240 determines 480 that the content device 140 and the mobile device 110 are simultaneously connected to the local network 150 based on the received token. The content engine 280 sends 490 a content item for presentation to the content device 140 in response to determining that the content device 140 and the mobile device 110 are simultaneously connected to the local network 150.

In some embodiments, the tokens sent by the issuing engine 230 expire after a predetermined duration of time (e.g., 1, 5, or 10 minutes). Using periodically expiring tokens may be advantageous for security or quality control purposes, e.g., to prevent other systems or devices from circumventing the issuing engine 230 to produce tokens. Responsive to determining that a token issued to a content device 140 has expired, the issuing engine 230 may send a subsequent token to the content device 140, and update the corresponding information in the network data store 235. Furthermore, the issuing engine 230 may also send an updated range of ports, and in return, the content device 140 may send information indicating a selected of a subsequent port from the updated range of ports to the online system 100. The content device 140 may send the subsequent token to a mobile device 110 via a re-established (or a new) connection using the subsequent selected port. Responsive to the online system 100 receiving the subsequent token from the mobile device 110, the content engine 280 provides a subsequent content item for presentation to the content device 140.

Figure 5:
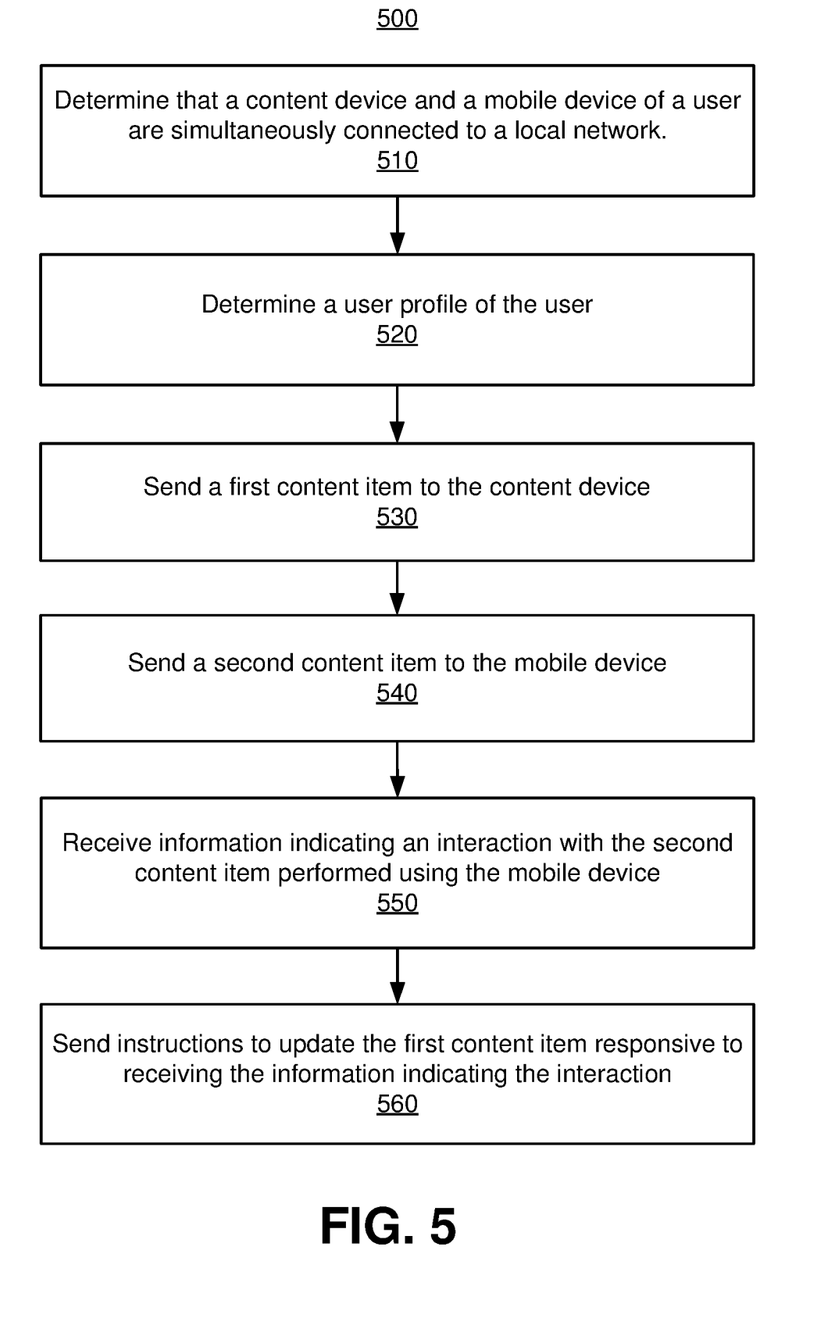
FIG. 5 is a flowchart illustrating a process for providing content items to a mobile device and a content device according to one embodiment.

FIG. 5 is a flowchart illustrating a process 500 for providing content items to a mobile device and a content device according to one embodiment. In some embodiments, the process 500 is performed by the online system 100—e.g., modules of the online system 100 described with reference to FIG. 2—within the system environment in FIG. 1. The process 500 may include different or additional steps than those described in conjunction with FIG. 5 in some embodiments or perform steps in different orders than the order described in conjunction with FIG. 5.

In one embodiment, the network engine 240 determines 510 that a content device 140 and a mobile device 110 of a user are simultaneously connected to a local network 150 (for example, using the method shown in FIG. 4). The content engine 280 determines 520 a user profile of the user with the online system 100 (e.g., stored in the user profile store 200) based on information identifying the user received from the mobile device 110 such as login information or a web cookie. The content engine 280 sends 530 a first content item to the content device 140 for presentation on a display based on determining (e.g., by the signal processing engine 250) that the content device 140 is located within a threshold physical proximity (e.g., threshold distance) to the mobile device 110. The content engine 280 may select the first content item based on the user profile. The content engine 280 sends 540 a second content item for presentation to the mobile device 110, where the second content item is associated with the first content item. The action logger 210 receives 550 information indicating an interaction with the second content item performed using the mobile device 110. The content engine 280 sends 560 instructions to update the first content item presented by the display of the content device 140 responsive to receiving the information indicating the interaction.

In some embodiments, the action logger 210 determines that the user is not interested in the first content item based on the interaction. For example, the interaction indicates that the user closed or skipped the first content item, or viewed the first content item for only a short period of time. Responsive to this determination, the content engine 280 sends a third content item to replace the first content item for presentation of the display of the content device 140. For example, the first content item includes information describing a certain genre of TV shows, while the third content item includes information describing a different genre of TV shows or other online media. The content engine 280 may select the third content item from a set of candidate content items not including the first content item. In an embodiment, the first content item may include content from a third party system 120, and the set of candidate content items does not include other content from the same third party system 120, e.g., because the online system 100 determines that the user does not have an interest in the third party system 120.

V. Alternative Embodiments

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product including a computer-readable non-transitory medium containing computer program code, which can be executed by a computer processor for performing any or all of the steps, operations, or processes described.

Embodiments of the invention may also relate to a product that is produced by a computing process described herein. Such a product may include information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   sending, by an online system, a token to a content device;
   receiving, by the online system, information indicating a network port from the content device;
   determining, by the online system, that the content device and a mobile device are potentially connected to a local network based on the information indicating the network port from the content device and network identifying information received from the mobile device;
   in response to determining that the content device and the mobile device are potentially connected to the local network, sending, by the online system, the information indicating the network port from the content device to the mobile device, the mobile device configured to receive the information indicating the network port and to connect to the content device through the network port;
   receiving, by the online system, a token from the mobile device, wherein the token received from the mobile device was sent from the content device to the mobile device through the network port;
   determining, by the online system, that the content device and the mobile device are simultaneously connected to the local network based on the token sent to the client device and the token received from the mobile device; and
   sending, by the online system to the content device, a content item for presentation in response to determining that the content device and the mobile device are simultaneously connected to the local network.

2. The method of claim 1, further comprising:
   selecting, by the online system, the content item based on a user profile of a user of the mobile device, the user profile maintained by the online system.

3. The method of claim 2, further comprising:
   receiving, by the online system from the mobile device, information identifying the user;
   identifying, by the online system, the user profile of the user of the mobile device based on the information identifying the user.

4. The method of claim 1, further comprising:
   sending a unique token to each of a plurality of content devices for determining whether the mobile device and the plurality of content devices are simultaneously connected to the local network.

5. The method of claim 1, further comprising:
   determining whether the token sent by the online system to the content device has expired; and
   in response to a determination that the token sent by the online system to the content device has expired, sending a subsequent token, by the online system, to the content device.

6. The method of claim 5, further comprising:
   receiving, by the online system, a new token from the mobile device, wherein the new token received from the mobile device was sent from the content device to the mobile device through a new connection between the content device and the mobile device;
   determining, by the online system, that the content device and the mobile device are simultaneously connected to the local network based on the subsequent token sent to the client device and the new token received from the mobile device; and
   sending, by the online system to the content device, a content item for presentation in response to determining that the content device and the mobile device are simultaneously connected to the local network.

7. The method of claim 1, further comprising:
   determining, by the online system, a physical proximity of the content device relative to the mobile device,
   wherein the online system sends the content item to the content device responsive to determining that the physical proximity is less than a threshold distance.

8. The method of claim 7, wherein determining the physical proximity of the content device relative to the mobile device comprises:
   receiving, by the online system from the mobile device, a signal transmitted by the content device and detected by the mobile device; and
   determining, by the online system, the physical proximity of the content device relative to the mobile device based on a strength of the signal.

9. A computer program product comprising a non-transitory computer readable storage medium having instructions encoded thereon that, when executed by a processor, cause the processor to:
- send, by an online system, a token to a content device;
- receive, by the online system, information indicating a network port from the content device;
- determine, by the online system, that the content device and a mobile device are potentially connected to a local network based on the information indicating the network port from the content device and network identifying information received from the mobile device;
- in response to determining that the content device and the mobile device are potentially connected to the local network, send, by the online system, the information indicating the network port from the content device to the mobile device, the mobile device configured to receive the information indicating the network port and to connect to the content device through the network port;
- receive, by the online system, a token from the mobile device, wherein the token received from the mobile device was sent from the content device to the mobile device through the network port;
- determine, by the online system, that the content device and the mobile device are simultaneously connected to the local network based on the token sent to the client device and the token received from the mobile device; and
- send, by the online system to the content device, a content item for presentation in response to determining that the content device and the mobile device are simultaneously connected to the local network.

10. The computer program product of claim 9, wherein the instructions further cause the processor to:
- select, by the online system, the content item based on a user profile of a user of the mobile device, the user profile maintained by the online system.

11. The computer program product of claim 10, wherein the instructions further cause the processor to:
- receive, by the online system from the mobile device, information identifying the user;
- identify, by the online system, the user profile of the user of the mobile device based on the information identifying the user.

12. The computer program product of claim 9, wherein the instructions further cause the processor to:
- send a unique token to each of a plurality of content devices for determining whether the mobile device and the plurality of content devices are simultaneously connected to the local network.

13. The computer program product of claim 9, wherein the instructions further cause the processor to:
- determine whether the token sent by the online system to the content device has expired; and
- in response to a determination that the token sent by the online system to the content device has expired, send a subsequent token, by the online system, to the content device.

14. The computer program product of claim 9, wherein the instructions further cause the processor to:
- determining, by the online system, a physical proximity of the content device relative to the mobile device, wherein the online system sends the content item to the content device responsive to determining that the physical proximity is less than a threshold distance.

15. A computer system comprising:
- a non-transitory computer-readable storage medium storing executable computer program instructions, the computer program instructions comprising instructions that when executed cause a computer processor to perform steps, comprising:
  - sending, by an online system, a token to a content device;
  - receiving, by the online system, information indicating a network port from the content device;
  - determining, by the online system, that the content device and a mobile device are potentially connected to a local network based on the information indicating the network port from the content device and network identifying information received from the mobile device;
  - in response to determining that the content device and the mobile device are potentially connected to the local network, sending, by the online system, the information indicating the network port from the content device to the mobile device, the mobile device configured to receive the information indicating the network port and to connect to the content device through the network port;
  - receiving, by the online system, a token from the mobile device, wherein the token received from the mobile device was sent from the content device to the mobile device through the network port;
  - determining, by the online system, that the content device and the mobile device are simultaneously connected to the local network based on the token sent to the client device and the token received from the mobile device; and
  - sending, by the online system to the content device, a content item for presentation in response to determining that the content device and the mobile device are simultaneously connected to the local network.

16. The system of claim 15, wherein the steps further comprise:
- selecting, by the online system, the content item based on a user profile of a user of the mobile device, the user profile maintained by the online system.

17. The system of claim 16, wherein the steps further comprise:
- receiving, by the online system from the mobile device, information identifying the user;
- identifying, by the online system, the user profile of the user of the mobile device based on the information identifying the user.

18. The system of claim 15, wherein the steps further comprise:
- sending a unique token to each of a plurality of content devices for determining whether the mobile device and the plurality of content devices are simultaneously connected to the local network.

19. The system of claim 15, wherein the steps further comprise:
- determining whether the token sent by the online system to the content device has expired; and
- in response to a determination that the token sent by the online system to the content device has expired, sending a subsequent token, by the online system, to the content device.

20. The system of claim 15, wherein the steps further comprise:
- determining, by the online system, a physical proximity of the content device relative to the mobile device, wherein the online system sends the content item to the content device responsive to determining that the physical proximity is less than a threshold distance.

\* \* \* \* \*